United States Patent

[11] 3,615,267

| [72] | Inventors | Waldo R. Golliher;<br>Robert L. Harris; Reynold A. LeDoux, all of Paducah, Ky. |
|---|---|---|
| [21] | Appl. No. | 806,293 |
| [22] | Filed | Mar. 11, 1969 |
| [45] | Patented | Oct. 26, 1971 |
| [73] | Assignee | The United States of America as represented by the United States Atomic Energy Commission |

[54] SEPARATION OF NEPTUNIUM FROM URANIUM HEXAFLUORIDE CONTAINING THE SAME
3 Claims, No Drawings

[52] U.S. Cl. ..................................... 23/337, 23/326, 23/343, 23/352, 176/14
[51] Int. Cl. ........................................ C01g 43/06
[50] Field of Search ........................... 23/326, 337, 343, 352; 176/10, 13, 14, 16

[56] References Cited
UNITED STATES PATENTS

| 2,838,366 | 6/1958 | Beaufait | 23/343 |
| 2,885,258 | 5/1959 | Bain | 23/337 |
| 2,990,243 | 6/1961 | Beaton | 23/337 |
| 3,178,258 | 4/1965 | Cathers et al. | 23/337 |
| 3,395,991 | 8/1968 | Grimes et al. | 23/337 |
| 3,432,276 | 3/1969 | Reas | 23/343 |
| 3,451,790 | 6/1969 | Katz et al. | 23/352 |
| 3,482,949 | 12/1969 | Trevorrow et al. | 23/326 |

FOREIGN PATENTS

| 1,353,220 | 1/1964 | France | 23/337 |

Primary Examiner—Benjamin R. Padgett
Assistant Examiner—F. M. Gittes
Attorney—Roland A. Anderson ABSTRACT: This invention relates to a method of selectively removing neptunium values from a gaseous mixture containing neptunium hexafluoride and uranium hexafluoride by passing the mixture through a bed of pelletized cobaltous fluoride at a temperature in the range 220° F. to 440° F. to effect removal of neptunium by the cobaltous fluoride.

SEPARATION OF NEPTUNIUM FROM URANIUM HEXAFLUORIDE CONTAINING THE SAME

BACKGROUND OF THE INVENTION

This invention was made in the course of, or under, a contract with the United States Atomic Energy Commission.

The present invention relates to the processing of uranium hexafluoride and more particularly to a process for selectively removing neptunium values from mixtures of uranium hexafluoride and neptunism hexafluoride.

One of the principal sources of uranium hexafluoride feed for uranium isotope separation by means of gaseous diffusion is derived from the processing of spent nuclear reactor fuels containing irradiated natural uranium. This material is reprocessed to recover plutonium and to separate other transuranium elements as well as fission products from the uranium. Reprocessing is effected by dissolving the irradiated uranium in nitric acid solutions and then extracting the uranium and plutonium values with an organic solvent. The uranium and plutonium are then separated by further solvent extraction or ion exchange cycles. Further details of aqueous separation processes of this type are disclosed in the Reactor Handbook, Vol. II (Fuel Reprocessing), Pgs. 131–184, Second Edition (1961). The purified uranium product is obtained in the form of a uranyl nitrate solution which is converted by subsequent processing to gaseous diffusion feed $UF_6$ by calcining the uranyl nitrate to form $UO_3$, reducing the $UO_3$ to $UO_2$ with hydrogen, reacting the $UO_2$ with HF to form $UF_4$, and then finally reacting the $UF_4$ with fluorine.

Although the bulk of the fission products and transuranium elements are removed by this reprocessing scheme, the product uranium still contains significant amounts of neptunium, the quantity of which varies with the irradiation history of the uranium and with the particular separation process involved. Separation of neptunium fluoride from reprocessed $UF_6$ is desired because it represents a significant health hazard for personnel who operate and repair diffusion cascade equipment. In addition, the presence of neptunium adversely affects the efficiency of the diffusion isotope separation process. Current federal specifications require that the $UF_6$ feed contain no more than about 1 part per million neptunium based on the weight of uranium in the $UF_6$ feed entering the cascade. It is therefore the principal object of this invention to provide a method of decontamination $UF_6$ from neptunium which effectively meets this criterion.

SUMMARY OF THE INVENTION

The present invention is predicated on the discovery that a porous bed of pelletized cobaltous fluoride will function to selectively reduce neptunium hexafluoride to nonvolatile form or neptunium tetrafluoride at a temperature in the range of 220° F. to 440° F. The neptunium is readily removed from the cobaltous fluoride bed and purified by the following procedure: Fluorine gas is passed through the charged bed at a temperature in the range 500° F. to 700° F. to reconvert the contained neptunium to gaseous neptunium hexafluoride and remove it from the bed.

In order to practice this invention, a porous bed of cobaltous fluoride is required. It should preferably consist of pellets which have sufficient strength and structural integrity to withstand repeated oxidation and reduction cycles at temperatures ranging from 220° F. to as high as 700° F. Suitable pellets can be prepared by the procedure described in U.S. Pat. No. 3,372,004, issued Mar. 5 1968, in the name of Earl W. Richardson et al.

Briefly, the method comprises mixing cobaltous fluoride with water to form a wet agglomerate and then heating the agglomerate to a sintering temperature of 1,200° F. in an atmosphere of anhydrous hydrogen fluoride. A satisfactory alternative is to spray the damp agglomerate with water and then air-dry to form suitable pellets. The pellets are sized to produce a batch in the range 1.7 to 2.4 millimeters. A final drying of the sized pellets in anhydrous HF for about 1 hour at 300° F. serves to reduce the amount of water associated with the pellets and hence eliminates or reduces the possibility for $UF_6$ to be hydrolyzed to a solid oxyfluoride. The dried pellets have a surface area in the range 10 to 11 square meters per gram and a void fraction from 0.75 to 0.85. The treated pellets are loaded into a column to form the required bed. Suitable heating means are provided to heat the cobaltous fluoride bed to a temperature which will maximize selective neptunium removal whereupon mixtures of uranium hexafluoride and neptunium hexafluoride are passed through the column to effect selective removal of neptunium.

Having described the invention in general terms together with a procedure for preparing the active ingredient needed to effect the desired separation, the following examples are provided as exemplary embodiments.

EXAMPLE I

Pelletized cobaltous fluoride prepared according to the general procedure described above was loaded into a ⅞-inch-ID by 12-inch-long trap. The pellets were dried by heating at 300° F. with a flowing purge of hydrogen fluoride for 1 hour. Thereafter, mixtures of $UF_6$ and $NpF_6$ were passed through the heated trap. Trap temperatures of 440° F., 300° F., and 210° F. were used to determine the effect of temperature on the separative effect of cobaltous fluoride. Provisions were made to sample the gas stream at the inlet to the trap and at the trap outlet. The results are summarized in table I below.

TABLE I

| | 440° F. | 300° F. | 210° F |
|---|---|---|---|
| Weight $CoF_2$, g | 68.3 | 67.6 | 71.5 |
| Pressure, p.s.i.a | 14.7 | 14.7 | 14.7 |
| Superficial velocity, ft./sec | 0.40 | 0.31 | 0.27 |
| Residence time, secs | 2.5 | 3.2 | 3.7 |
| Average inlet concentration, p.p.m. $Np^1$ | [2] 24.4–40.4 | 28 | 41.5 |
| Average outlet concentration, p.p.m. $Np^1$ | 0.61–0.58 | 0.24 | 1.7 |
| Length of run, hrs | 9.75–5.25 | 16 | 10 |
| Bed analyses: | | | |
| First inch of material from inlet end: | | | |
| Concentration of Np, mg./g | 48 | 22.2 | 14.4 |
| Np retained, percent [3] | 67 | 27 | 31 |
| Concentration of U, g./g | 0.06 | 0.06 | 0.07 |
| Next two inches of material: | | | |
| Concentration of Np, mg./g | 6 | 15.0 | 4.1 |
| Np retained, percent [3] | 17 | 37 | 18 |
| Concentration of U, g./g | 0.08 | 0.070 | 0.070 |
| Last nine inches of material: | | | |
| Concentration of Np, mg./g | 1.3 | 3.3 | 2.6 |
| Np retained, percent [3] | 16 | 36 | 51 |
| Concentration of U, g./g | 0.09 | 0.05 | 0.05 |
| Np retained based on inlet and outlet concentration, percent | 98 | 99 | 96 |

[1] The neptunium concentration is based on uranium.
[2] Neptunium inlet concentration increased after 9.75 hours.
[3] Neptunium retained is the mg. found in the section divided by the total weight of Np in mg. contained in the $CoF_2$ after exposure and represented as a percent.

The results indicate that cobaltous fluoride will selectively remove neptunium at a temperature as low as 210° F., but that the process is more efficient at a temperature in the range 440° F. This is shown by the outlet concentration of neptunium as a function of temperature and the analyses of the cobaltous fluoride after exposure. The difference between 300° F. and 440° F. operation appears insignificant for this trap length when measured by outlet concentration at constant inlet concentrations. However, the bed analyses show that more neptunium is retained in the first inch of the bed operated at 440° F. than for one operated at 300° F. This shows that a substantially higher loading is obtained at 440° F. than at 300° F. Subsequent findings have indicated that no apparent advantage is gained from operating the bed at temperatures higher than about 450° F.

EXAMPLE II

The procedure of example I was followed with the exception that the cobaltous fluoride was loaded into a trap 5 feet in length with provisions made to sample the gas stream at the inlet to the trap, after 1 foot of cobaltous fluoride, and at the trap outlet. The results of a continuous run are summarized in table II below.

with an outlet concentration of less than 0.2 p.p.m. based on the weight of uranium, well within the product specification for $UF_6$ as required by United States Federal Regulations.

What is claimed is:

TABLE II

[Loading Studies on Removal of $NpF_6$ from $UF_6$-$NpF_6$ with $CoF_2$]

| Time [1] (hrs.) | Temp. (°F.) | Superficial velocity (ft./sec.) | Residence time (secs.) | Np fed (g.) | Average inlet (p.p.m. Np) | Average outlet 1 (p.p.m. Np) | Average outlet 2 (p.p.m. Np) | D.F.[2] for 1-ft. trap | D.F. for 5-ft. trap |
|---|---|---|---|---|---|---|---|---|---|
| 58 | 300 | 0.29 | 17.2 | 3.7 | 93.5 | 6.1 | 0.12 | 15 | 779 |
| 20 | 300 | 0.25 | 20 | 0.24 | 17 | 0.67 | 0.08 | 25 | 213 |
| 22 | 440 | 0.24 | 20 | 0.13 | 9.8 | 0.18 | 0.05 | 54 | 196 |
| 34 | 300 | 0.50 | 10 | 0.43 | 9.0 | 0.58 | 0.04 | 16 | 225 |
| 14 | 300 | 1.0 | 5.0 | 0.53 | 13.3 | 1.07 | 0.03 | 12 | 443 |
| 38 | 300 | 0.5 | 10.0 | 5.6 | 106.1 | [3]47.6 | 0.40 | 2 | 265 |
| 28 | 300 | 0.5 | 10.0 | 0.90 | 23.4 | 8.0 | 0.05 | 3 | 468 |
| Total | | | | 11.5 | | | | | |

[1] Designates the number of hours the system was operated at specified conditions.
[2] Decontamination factor.
[3] Breakthrough occurred in the 1-foot trap during this period.

It should be noted that this run confirmed the previous findings of example I. The selectivity of cobaltous fluoride was evidenced by the removal of 11.5 grams of neptunium by 340 grams of cobaltous fluoride. The effect of reducing the inlet concentration has only a small effect on the outlet concentration from the 5-foot trap. Increasing the temperature to 440° F. shows only a slight improvement. The difference between 0.25 and 1.0 ft/sec. superficial bed velocity shows no significant difference at this loading.

It is concluded from the loading studies presented in examples I and II that a practical system is provided for removal of neptunium from a gaseous stream containing $UF_6$ and $NpF_6$. A loading factor in excess of 3.3 percent of the bed is obtainable 1. A method for selectively removing neptunium values from a gaseous mixture of uranium hexafluoride and neptunium fluoride which comprises contacting said gaseous mixture with a bed of cobaltous fluoride pellets at a temperature in the range 200° F. to 440° F. and collecting the resulting exit gas decontaminated from neptunium.

2. The method according to claim 1 in which the uranium hexafluoride gas issuing from the contacted cobaltous fluoride contains less than 2 p.p.m. of neptunium based on the weight of uranium.

3. The method according to claim 1 in which the neptunium is received from the cobaltous fluoride by treatment with fluorine gas at a temperature in the range of 500° F. to 700° F.

* * * * *

PO-1050
(5/69)

UNITED STATES PATENT OFFICE
CERTIFICATE OF CORRECTION

Patent No. __3,615,267__    Dated __October 26, 1971__

Inventor(s) __Waldo R. Golliher et al.__

It is certified that error appears in the above-identified patent and that said Letters Patent are hereby corrected as shown below:

Column 1, line 10, "neptunism" should read ---neptunium---; line 45, "decontamination" should read ---decontaminating---; line 66, a comma (,) should be inserted after "Mar. 5".

Column 2, Table I, first line, "$CoF^2$" should read ---$CoF_2$---.

Column 4, line 32, "received" should read ---recovered---.

Signed and sealed this 27th day of June 1972.

SEAL)
.ttest:

:DWARD M. FLETCHER, JR.
.ttesting Officer

ROBERT GOTTSCHALK
Commissioner of Patents